May 23, 1939.　　　F. R. McCRUDDEN　　　2,159,393
SPRING WASHER
Filed Sept. 10, 1936　　　2 Sheets-Sheet 1

INVENTOR
FREDERICK R. McCRUDDEN.
BY
Smith & Matters
ATTORNEYS

May 23, 1939.                F. R. McCRUDDEN                2,159,393
                                SPRING WASHER
                            Filed Sept. 10, 1936            2 Sheets-Sheet 2
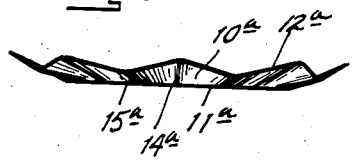
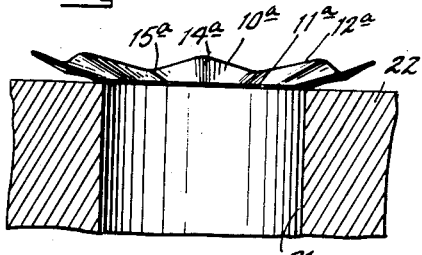
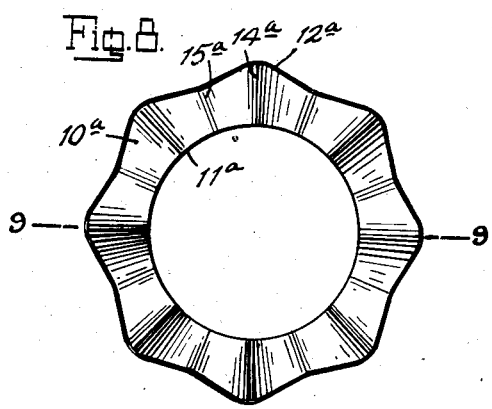
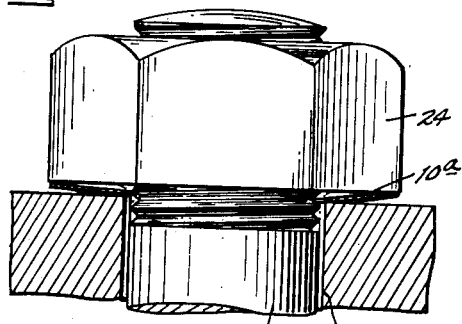
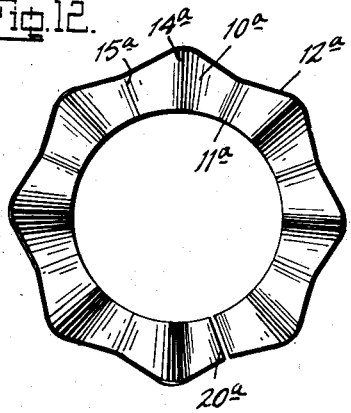
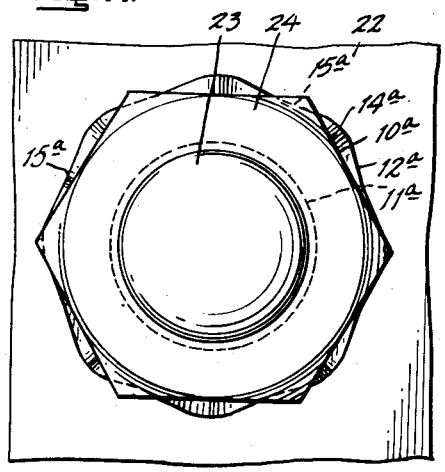
INVENTOR
FREDERICK R. McCRUDDEN.
BY
Smith & Mattern
ATTORNEYS Patented May 23, 1939

2,159,393

UNITED STATES PATENT OFFICE 2,159,393

SPRING WASHER

Frederick R. McCrudden, Bloomfield, N. J., assignor to The National Lock Washer Company, Newark, N. J., a corporation of New Jersey Application September 10, 1936, Serial No. 100,078

1 Claim. (Cl. 151—38)

The present invention relates to an improvement in spring washers, and has for an object to provide a spring washer formed of very thin metal having corrugations or flutes pressed therein, which in the engaged and compressed relation of the washer with a screw head, nut or the like are ironed out producing tension and friction between the screw head, nut or the like and the structure engaged thereby to effectively retain the screw head or nut against turning and looseness. According to one embodiment of the invention I propose to provide a spring of this character which may be engaged in a countersink opening to be compressed between such opening and the tapered head of a screw. According to another embodiment I propose to provide a spring washer which may be engaged between the flat surfaces of a screw head or nut and a flat structure engaged thereby.

With the above and other objects in view, embodiments of the invention are shown in the accompanying drawings, and these embodiments will be hereinafter more fully described with reference thereto and the invention will be finally pointed out in the claim.

In the drawings:

Fig. 7 is a side elevation of a modified form of spring washer, according to the invention, adapted for insertion between flat surfaces.

Fig. 8 is a top plan view thereof.

Fig. 9 is a sectional view of the washer, taken along the line 9—9 of Fig. 8, and showing the same engaged upon a flat apertured structure, also shown in vertical section.

Fig. 10 is a sectional view similar to Fig. 9 and showing the bolt and nut engaged with the aperture of the structure, the washer being compressed.

Fig. 11 is a plan view of the structure as shown in Fig. 10.

Fig. 12 is a top plan view of a modified form of washer similar to that shown in Figs. 7 to 11, but split.

Similar reference characters indicate corresponding parts throughout the several figures of the drawings.

Figure 1:
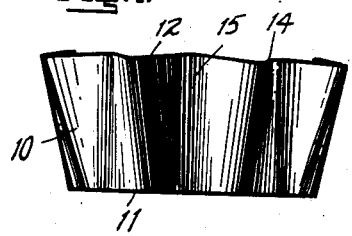
Fig. 1 is a side elevation of a spring washer according to my invention, and adapted for engagement in a countersink opening.

Referring to the drawings and more particularly to Figs. 1 to 5 thereof, the spring washer 10 is formed of a very thin metal, which before shaping will be in the form of a substantially flat ring, and is provided at its lower extremity with a circular edge 11 lying in a horizontal plane and at its upper extremity with a corrugated edge 12, which in the exemplary embodiment is sinuously curved, the side wall of the washer between the points of the corrugations and the lower edge 11 having a ridge-like bend 14 inclined upwardly and outwardly while the bends 15 between the points extend from the lower edge 11 to the upper edge 12 along lines at considerably smaller angles to the central axis of the washer than the bends 14. Tapered corrugations or flutes are thus provided in the side walls.

In producing the washer it is first pressed into shape in a suitable metal die to form the corrugations or flutes prior to heat treatment, the washer then being heat treated to produce the necessary temper to render it springy.

Figure 3:
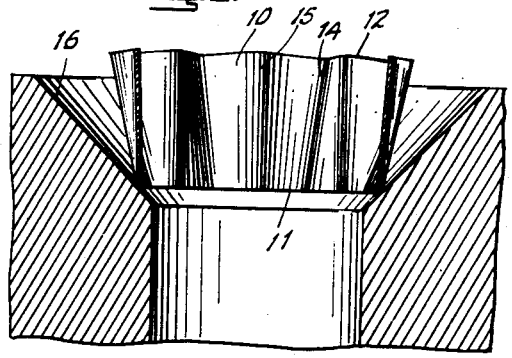
Fig. 3 is a sectional view of the washer taken along the line 3—3 of Fig. 2, and showing the same engaged in a countersink structure, also shown in vertical section.
Figure 2:
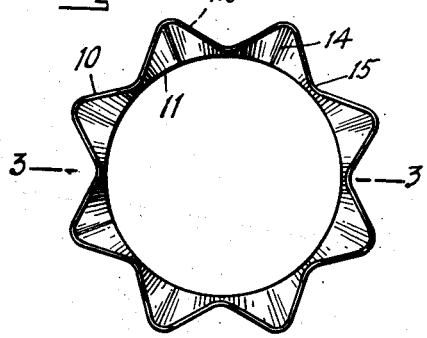
Fig. 2 is a top plan view thereof.

As shown in Fig. 3 the washer is adapted to be engaged in a countersink 16, the conical angle of which is considerably greater to the axis than the angle of the outwardly inclined bends 14, the lower circular edge 11 of the washer seating firmly and continuously upon the countersink near its lower edge and the upper corrugated edge 12 in the uncompressed state being above the upper edge of the countersink to a sufficient degree than when the washer is compressed the upper edge will lie contiguous to the upper edge of the countersink. The screw 17 having a tapered head 18 is engaged in the countersink and as it is tightened through screwing into the threaded part 19 the spring washer is ironed out through the camming action of the conical screw head, the lower circular edge 11 remaining in place while the washer above this edge is pressed into relation with the countersink surface.

Figure 4:
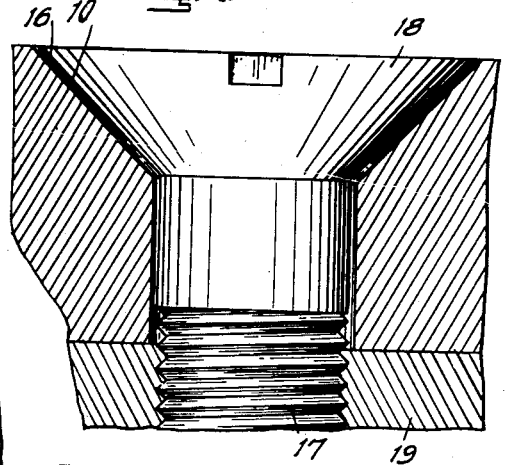
Fig. 4 is a sectional view showing the screw engaged with the countersink and the washer compressed.
Figure 5:
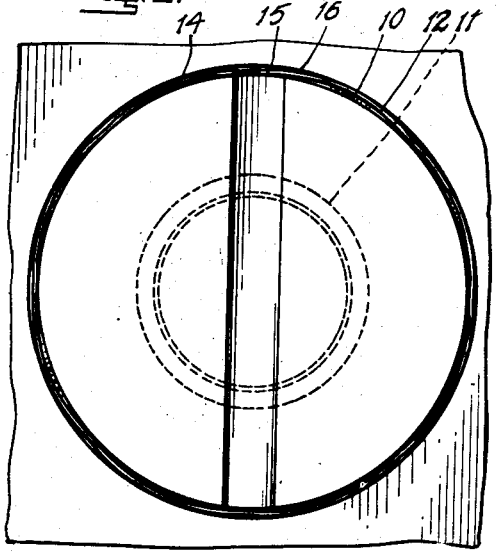
Fig. 5 is a plan view of the structure as shown in Fig. 4.

In the compressed relation of the spring washer as shown in Figs. 4 and 5 there will be slight corrugations remaining in the washer exerting frictional pressure under spring reaction against the surfaces of the countersink and the screw head, thus effectively retaining the screw against turning and looseness. While the washer is entirely effective in its functioning the very thin metal from which it is formed permits it to engage between the countersink and the screw head without leaving a large space between the countersink and the screw head. Also the exceedingly thin metal permits considerable flexure when a load is applied.

Figure 6:
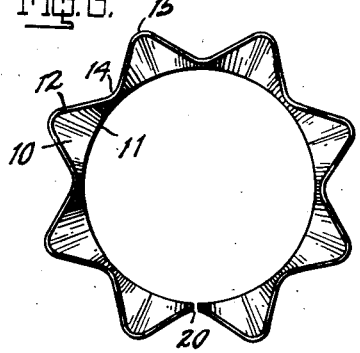
Fig. 6 is a top plan view of a modified form of washer, similar to that shown in Figs. 1 to 5, but split.

In Fig. 6 I have illustrated a modification in which the washer is similar to that shown in Figs. 1 to 5, but is provided with a split 20 along one of its bends 15.

In Figs. 7 to 12 I have shown a modified form of washer 10ª similar in general structure to the washer shown in Figs. 1 to 5, but considerably flatter, and adapted for engagement between flat surfaces as distinguished from the conical surfaces engaged by the washer shown in Figs. 1 to 5, the washer 10ª being provided with a circular lower edge 11ª, corrugated upper edge 12ª, and bends 14ª and 15ª in its side wall. As shown in Figs. 9 to 11 the washer 10ª is engaged about the bolt hole 21 of a structure 22 having a flat top, the bolt hole being engaged by a bolt 23 having a nut 24 screwed thereon. The washer is compressed between the flat lower surface of the nut 24 and the flat upper surface of the structure 22, being ironed out through the tightening action of the nut to an approximately flat shape, so that its slightly corrugated and tensioned structure frictionally engages the flat surfaces under spring reaction and prevents turning and loosening of the nut.

In Fig. 12 I have shown a modification in which the washer is similar to that shown in Figs. 7 to 11, but is provided with a split 20ª along one of its bends 15ª.

I have illustrated and described preferred and satisfactory embodiments of the invention, but it will be obvious that changes may be made therein, within the spirit and scope thereof, as defined in the appended claim.

Having thus described my invention what I claim and desire to secure by Letters Patent is:

A spring washer, for interposition between a screw head or the like and a surface surrounding a screw receiving hole, comprising a ring of normally flat thin pliable spring metal having bends alternately projecting upwardly and downwardly along radial lines, the bending starting at the inner edge of said ring and gradually increasing to the outer edge, whereby said inner edge is in a flat plane and circular and said outer edge is undulating and of the same lineal extent as the outer edge of the normally flat ring, said bends being in continuously straight lines between said inner and outer edges, said inner edge of the ring adapted to seat upon said hole surrounding surface to constitute a fulcrum line about which the inwardly and outwardly projected surfaces of the bends respectively move into straight line engagement with the surface of said screw head and said hole surrounding surface, and said inner edge being of the same diameter and circular shape in both the flat and bent conditions of said washer.

FREDERICK R. McCRUDDEN.